W. C. CULBERTSON.
CORN HUSKING MACHINE.
APPLICATION FILED JUNE 16, 1911.
1,018,881.
Patented Feb. 27, 1912.
3 SHEETS—SHEET 1.
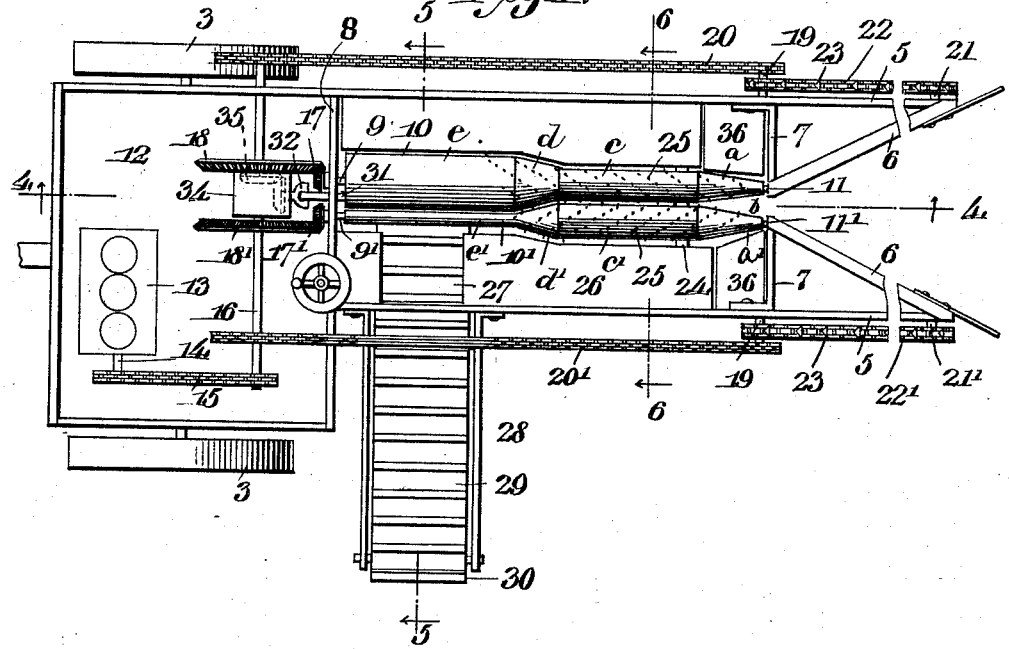
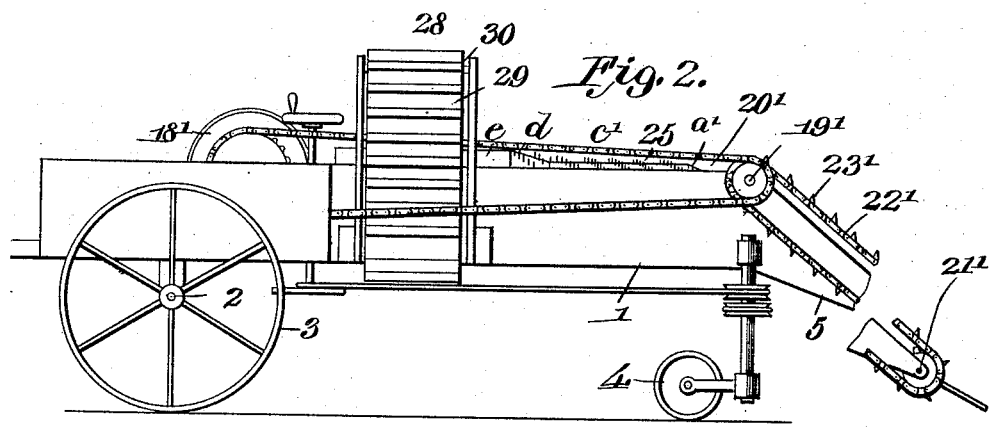
Witnesses
Inventor
William C. Culbertson.
By Victor J. Evans
Attorney W. C. CULBERTSON.
CORN HUSKING MACHINE.
APPLICATION FILED JUNE 16, 1911.
1,018,881.
Patented Feb. 27, 1912.
3 SHEETS—SHEET 2.
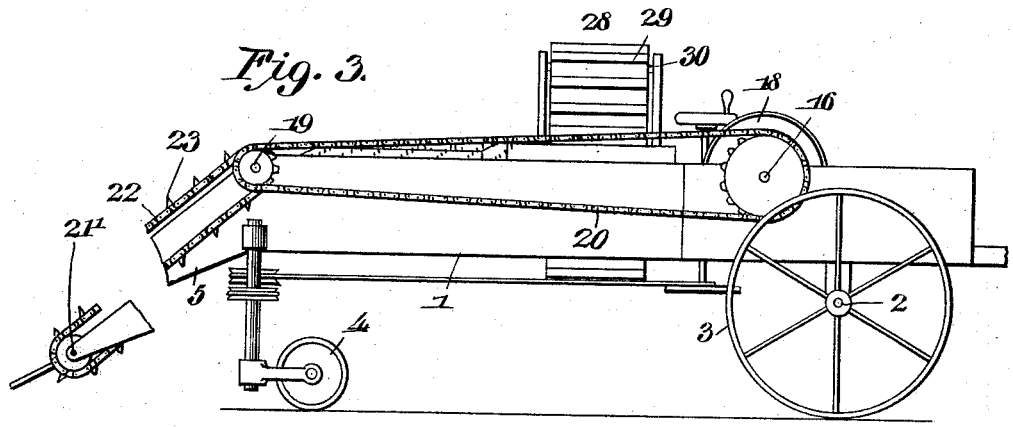
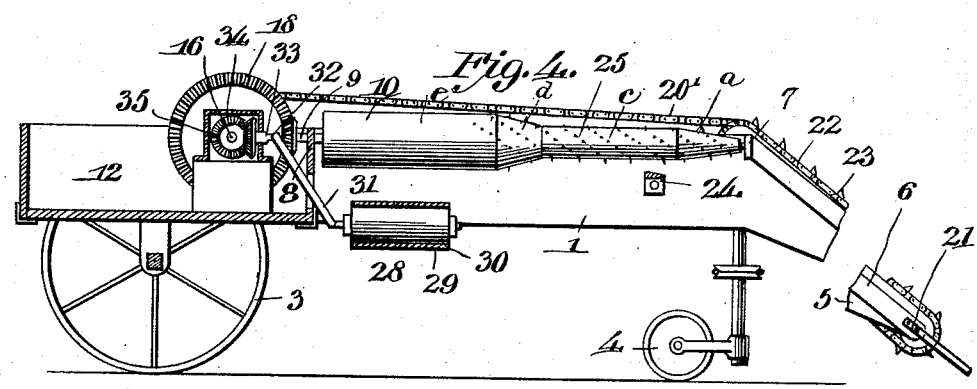
Witnesses
Inventor
William C. Culbertson
By Victor J. Evans
Attorney

W. C. CULBERTSON.
CORN HUSKING MACHINE.
APPLICATION FILED JUNE 16, 1911.

1,018,881.

Patented Feb. 27, 1912.

3 SHEETS—SHEET 3.

Witnesses
D. B. Galt
Wm Bagger

Inventor
William C. Culbertson.
By Victor J. Evans
Attorney

UNITED STATES PATENT OFFICE.

WILLIAM C. CULBERTSON, OF RUSHVILLE, INDIANA.

CORN-HUSKING MACHINE.

1,018,881.  Specification of Letters Patent.  Patented Feb. 27, 1912.

Application filed June 16, 1911. Serial No. 633,456.

*To all whom it may concern:*

Be it known that I, WILLIAM C. CULBERTSON, a citizen of the United States, residing at Rushville, in the county of Rush and State of Indiana, have invented new and useful Improvements in Corn-Husking Machines, of which the following is a specification.

This invention relates to corn husking machines of that class which are mounted upon wheels and adapted to be drawn or propelled over the corn field to engage the rows of corn stalks, to break or snap the ears therefrom, to strip the husks from the ears and to deliver the latter into a suitable receptacle, such as the box of a wagon driven alongside, the corn stalks being left standing in the field.

The present invention has for its main object to provide combined snapping and husking rollers of a simple and improved construction which will thoroughly coöperate with each other and with other parts of the machine to snap the ears from the stalks and to strip the husks therefrom.

A further object of the invention is to produce an organized machine of the character described which shall be simple in construction and thoroughly efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 5:
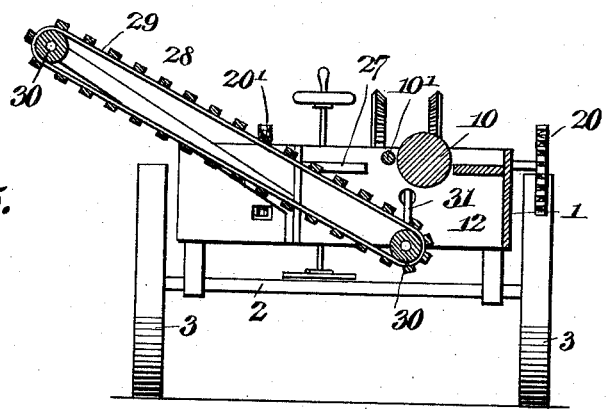
Figure 6:
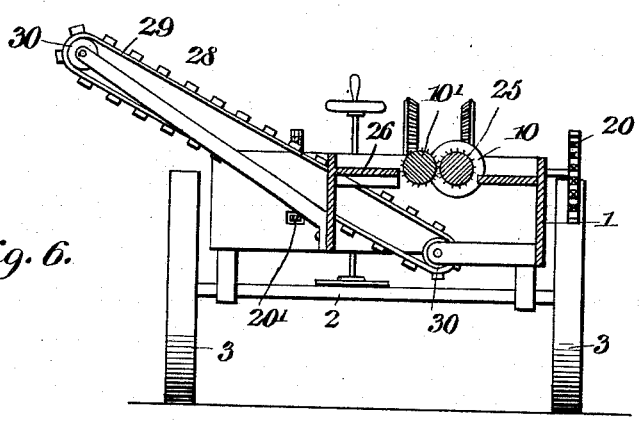
Figure 7:
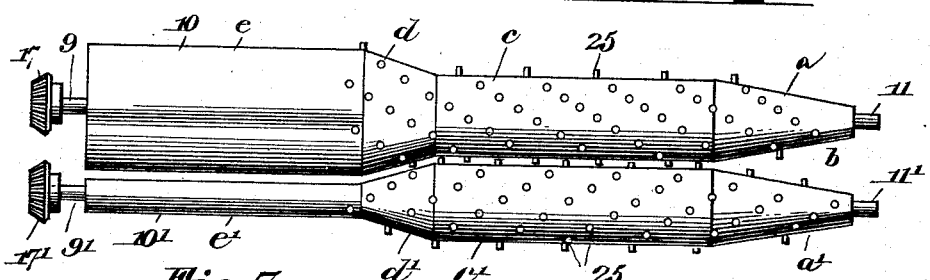

In the drawings,—Figure 1 is a top plan view of a machine constructed in accordance with the invention. Fig. 2 is a side elevation of the same, showing the ear discharging side of the machine. Fig. 3 is a side elevation showing the opposite side of the machine. Fig. 4 is a longitudinal sectional view taken on the plane indicated by the line 4—4 in Fig. 1. Fig. 5 is a transverse sectional view taken on the line 5—5 in Fig. 1. Fig. 6 is a transverse sectional view taken on the line 6—6 in Fig. 1. Fig. 7 is a detail plan view on a larger scale of the stalk engaging rolls detached.

Corresponding parts in the several figures are denoted by like characters of reference.

The frame 1 of the improved machine is supported near its rear end upon an axle 2 having wheels 3, 3. The front end of the frame is supported upon caster wheels 4 for convenience in turning and guiding the machine.

The side members of the frame are extended downwardly and forwardly to form arms 5 with the front ends of which the corn stalk guides 6 are connected, said stalk guides converging upwardly and rearwardly, as shown, and the rear ends thereof being connected with and spaced from the side members of the frame by brace members 7. Adjacent to their rear ends the side members of the frame support a cross bar or brace 8 that serves to support the journals 9, 9′ at the rear ends of the rolls 10, 10′, said rolls being provided at their front ends with journals 11, 11′ engaging the brace members 7, said rolls being thus supported for rotation with the axes of said rolls in approximate parallel relation.

A platform 12 supported at the rear end of the frame carries a suitable motor 13 including a driven shaft 14 from which motion is transmitted by a link belt or chain 15 to a counter shaft 16, which latter is supported in suitable bearings upon the platform and which extends transversely of the machine in rear of the rolls, as shown. The journals 9, 9′ at the rear ends of the rolls are equipped with bevel pinions 17, 17′ meshing with bevel gears 18, 18′ upon the shaft 16 from which motion in the proper direction will thus be conveyed to the rolls.

Supported in suitable bearings adjacent to the front ends of the side members of the frame 1 are stub shafts 19, 19′ that receive motion through the medium of chains or link belts 20, 20′ from the shafts 16. Shafts 21, 21′ which are supported for rotation at the front ends of the arms 5 are connected with the shafts 19, 19′ by means of chains 22, 22′, the links of which are provided with spurs 23, 23′, respectively, to engage the down stalks for the purpose of lifting such stalks and guiding them between the guides 6, which latter, however, extend beyond the extreme front ends of the arms 5, and diverge from said arms, as clearly seen in Fig.

1, so that said guides, which are of a somewhat resilient nature, will engage the down stalks and direct them upwardly and rearwardly, the movement being greatly assisted by the chains 23, 23', whereby the stalks will be gradually lifted and guided rearwardly as the machine progresses until the stalks finally enter between the forward ends of the rolls 10, 10'.

The rolls 10, 10' which are disposed as closely together as may be deemed practically expedient without being in actual contact are provided with conical front ends $a$, $a'$, each of which is tapered to a point, and said conical front portions combine to present between them a V-shaped gap $b$ for the admission of the corn stalks. Immediately in rear of the conical portions $a$, $a'$ the rolls are provided with cylindrical sections $c$, $c'$ which are approximately of equal diameter. Immediately in rear of the cylindrical portion $c$, the diameter of the roll 10 is gradually increased to present a frustum-shaped portion $d$, and the diameter of the corresponding portion of the roll 10' is gradually decreased to present a frustum-shaped portion $d'$. Immediately in rear of the frustum-shaped portions $d$, $d'$ the rolls 10, 10' are provided with cylindrical portions $e$, $e'$, it being, however, evident that the diameter of the cylindrical portion $e$ of the roll 10 considerably exceeds that of the cylindrical portion $e'$ of the roll 10'. The surfaces as well as the axes of the rollers will thus be disposed in approximately parallel relation throughout.

Suitably secured in the frame 1 beneath the rolls 10, 10' and extending transversely adjacent to the forward ends of the cylindrical portions $c$, $c'$ of said rolls is an obstructing bar 24 constituting a stalk bender which, being disposed directly in the path of the corn stalks, the latter being, however, buckled downward by the convergent portions of the conical front ends $a$, $a'$ of the rolls. Said rolls are provided throughout with spirally disposed series of teeth or pegs 25 which, at the extreme front ends of the rolls, operate to assist in buckling the stalks downward, the ears being snapped or stripped from the stalks by engagement with the bases of the conical front ends of the rolls. The ears being now thrown upon the rolls will be moved rearwardly by engagement with the teeth or pegs, and the latter will operate to loosen the husks upon the ears until the frustum-shaped portions $d$, $d'$ of the rolls is reached. The diameter of the roll 10 now increases rapidly, while the diameter of the roll 10' decreases rapidly, and the larger roll will thus overhang the smaller roll and serve to throw the ear which at this point becomes denuded of the husk over the relatively small cylindrical portion $e'$ of the roll 10', causing it to drop upon the inclined guideboard 26, whereby it is guided through an aperture 27 into the trough of an elevator 28 which extends laterally from the frame with which it is suitably connected. The inner end of the elevator extends beneath the rear ends of the rolls 10, 10', and said elevator includes an endless carrier 29 which is supported upon cylindrical rollers 30 at the ends of the trough or casing 28, one of said rollers being driven by means of a shaft 31, one end of which is connected therewith by means of a universal joint 32, the opposite end of said shaft being likewise universally joined to a shaft 33 supported in a boxing 34 associated with the line shaft 16. The latter is connected by bevel gearing 35 with the shaft 33 which is thereby driven and through the medium of which motion is transmitted to the carrier of the elevator.

The frame of the machine is provided adjacent to the front ends of the rolls 10, 10' with flanges or lids 36 constituting deflectors to keep the corn in engagement with the rolls.

In the operation of this invention, the machine may be drawn over the field by horses which are preferably attached to a tongue that extends rearwardly from the frame of the machine so that the latter will be pushed or propelled in front of the draft animals. The working parts of the machine are driven by the motor provided for the purpose which may be an ordinary internal combustion engine of approved construction, although any desired type of motor may be used. The working parts of the machine being thus driven, it follows that the draft needed to propel the machine is comparatively light, and a machine may thus be constructed to operate upon two or more rows of corn simultaneously without requiring excessively heavy draft. The general construction of the machine is simple, and it is found that not only will the ears be stripped from the standing stalks, but down stalks will be successfully lifted, and the ears stripped therefrom, thereby avoiding waste and the extra labor required to go over the field a second time for the purpose of gleaning the leavings from the first operation. The ears having been detached from the stalks by the rolls 10, 10' will by the same rolls become stripped or denuded of the husks, and the latter will be dropped upon the ground between the rolls, while the ears will be conveyed to the elevator and by the latter to a receptacle or place of deposit.

Having thus described the invention, what is claimed as new, is:—

1. In a corn husking machine, a pair of rolls supported for rotation with their axes in approximately parallel relation, said rolls being provided with parallel cylindrical portions of equal diameter, with parallel cylindrical portions of unequal diameter and with intermediate tapered portions.

2. In a corn husking machine, a pair of rolls supported for rotation with their axes in approximately parallel relation, said rolls being provided with parallel cylindrical portions of equal diameter, with parallel cylindrical portions of unequal diameter, with intermediate tapered portions, the opposed portions of the faces of which are in parallel relation, and with conical tapered points extending forwardly from the cylindrical portions of equal diameter.

3. In a corn husking machine, a frame, rotary supporting means for said frame, a pair of driven rolls supported for rotation upon the frame with their axes in approximately parallel relation, said rolls being provided with conical tapered points at their front ends, with parallel cylindrical portions of equal diameter in rear of and adjacent to said conical points, with rear portions of unequal diameter and with intermediate oppositely tapered portions connecting the portions of unequal diameter with the cylindrical portions of equal diameter and means whereby said rolls are simultaneously driven in opposite directions.

4. In a corn husking machine, a pair of rolls supported for rotation with their axes in approximately parallel relation, said rolls being provided with cylindrical portions of equal diameter, with cylindrical portions of unequal diameter, with oppositely tapered portions connecting the portions of unequal diameter with the portions of equal diameter, and with conical tapered portions extending forwardly from the cylindrical portions of equal diameter, said rolls being provided with pins spirally disposed upon the cylindrical portions of equal diameter, upon the conical points and upon the intermediate tapered portions, said pins being arranged in right and left spirals upon the two rolls.

5. In a corn husking machine, a frame, supporting wheels for said frame, a pair of combined stripping and husking rolls supported for rotation upon the frame, said rolls having cylindrical portions of equal diameter, conical points extending forwardly therefrom, rear cylindrical portions of unequal diameter and intermediate oppositely tapered portions, stalk engaging means to guide the stalks to the rolls, an elevator extending beneath the rear ends of the rolls which are of unequal diameter to receive the husked ears as they are tilted over the cylindrical roller portion of relatively small diameter, means for driving the rolls, and means for actuating the elevator.

6. In a corn husking machine, a frame, supporting wheels for said frame, a pair of combined snapping and husking rolls supported for rotation upon the frame, said rolls having cylindrical portions of approximately equal diameter, of conical points extending forwardly therefrom, rear cylindrical portions of unequal diameter, and intermediate oppositely tapered portions, means for driving the rolls, stalk engaging means extending forwardly of the rolls, and a stalk bending member extending transversely beneath the cylindrical portions of the rolls which are of equal diameter.

In testimony whereof I affix my signature in presence of two witnesses.

WILLIAM C. CULBERTSON.

Witnesses:
 BEN L. SMITH,
 CLAUDE CAMBEM.

---

Copies of this patent may be obtained for five cents each, by addressing the "Commissioner of Patents, Washington, D. C."